Nov. 7, 1939.    J. CHKLIAR    2,179,401
ROTARY INTERNAL COMBUSTION ENGINE
Filed Oct. 22, 1935
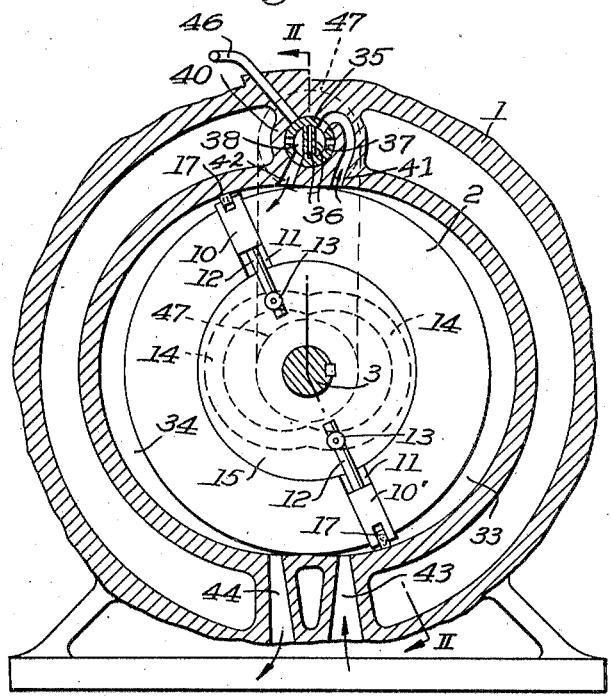
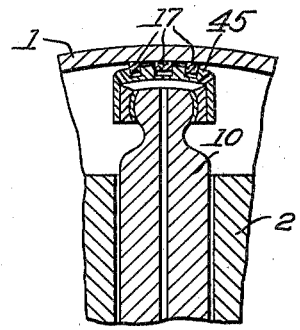
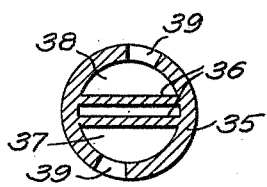
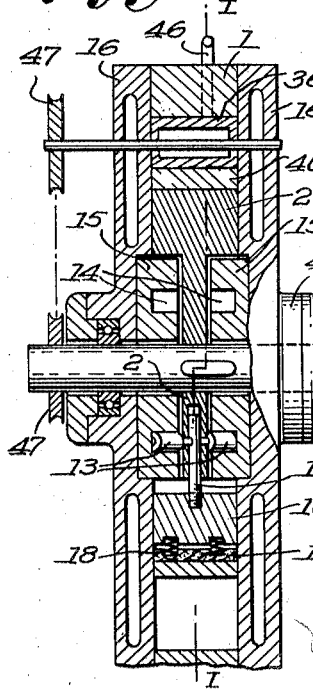
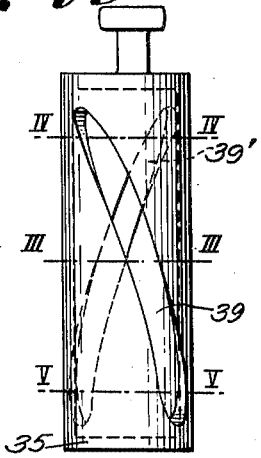
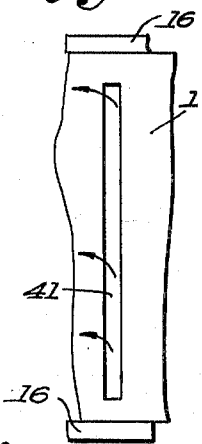
Inventor:
JACQUES CHKLIAR
By E. F. Wenderoth
Attorney.

Patented Nov. 7, 1939

2,179,401

UNITED STATES PATENT OFFICE 2,179,401

ROTARY INTERNAL COMBUSTION ENGINE

Jacques Chkliar, Brussels, Belgium

Application October 22, 1935, Serial No. 46,169
In Belgium October 24, 1934

2 Claims. (Cl. 123—16)

The present invention relates to a rotary internal combustion engine of the type comprising a cylindrical body or rotor mounted to rotate in a casing or stator in which chambers having their longitudinal section in arcs of a circle are provided all round the rotor, said chambers being swept by radially slidable blades or vanes fitted in the rotor and operated for sliding by the centrifugal force owing to the rotation of the rotor.

The invention concerns more particularly a rotary internal combustion engine of the type before described having contiguous chambers of the stator twined by pairs succeeding in the direction of the rotation of the rotor, one chamber of every pair forming an air compression chamber and the other a combustion and expansion chamber.

The invention contemplates an association of cooperating mechanical devices by which the problems of the heat utilisation, of the gas tight joints between different parts and the working fluid supply in a rotary internal combustion engine of the type described are solved so that the engine is able to work with a high degree of efficiency.

One object of the invention is to provide a rotary internal combustion engine of the type described in which a gas mixture is formed and ignited within an auxiliary chamber provided in the stator and termed hereinafter "precombustion chamber", said gas mixture being delivered burning from said precombustion chamber into the combustion and expansion chamber of the engine.

To this effect, according to the invention, the compressed air is driven from a compression chamber of the engine by the fore side of a movable blade into said precombustion chamber into which chamber fuel under pressure is injected so as to form a gas mixture which after being ignited in said precombustion chamber is delivered burning into a combustion and expansion chamber of the engine wherein the working fluid acts on the rear side of the same blade which has been moved in the intervening time from the compression chamber to the combustion and expansion chamber of the engine.

Another object of the invention is to provide a rotary internal combustion engine of the type before described in which a gas tight joint between said movable blades and the inside wall of the stator is insured without any excessive pressure of the rotary parts on the rotor being exerted so that any braking action is prevented.

In order that the construction be simplified, and also the dead spaces and the number of distribution parts reduced, according to the invention, said precombustion chamber is movable and provided with two cells of equal volume, each cell connected alternately to a compression chamber and a combustion and expansion chamber of the rotary engine by means such that, when the rotor is rotated, one of said cells communicates with the compression chamber and the second cell is connected to the combustion and expansion chamber.

In a preferred embodiment of the invention, said movable precombustion chamber is formed by a rotary tubular valve separated by a longitudinal partition in two symmetrical chambers having each a helical port, said rotary valve being adapted to rotate in a cylindrical housing provided in the stator and connected by means of ports with the compression chamber and the combustion and expansion chamber of the engine so as to insure on the one hand, the passage of the compressed air from the compression chamber of the engine into the rotary valve during the whole compression stroke and, on the other hand, the delivery of the gas mixture which has been ignited in the rotary valve, from said valve to the combustion chamber for the whole duration of the combustion stroke.

Other novel features of construction and arrangement of parts of the internal-combustion engine according to the invention will appear from the following description of the accompanying drawing which is however merely intended to diagrammatically illustrate by way of example an embodiment of the principles of my invention without limiting the scope of the constructions shown.

Fig. 1 shows in sectional view the arrangement of principal parts of the new rotary engine having two chambers.

Fig. 2 is a cross section of the engine as shown in the Fig. 1 along the line II—II in Fig. 1.

Fig. 3 is a side elevation of the rotary valve as used in the engine as illustrated in Fig. 1.

Fig. 4 is a cross section of the rotary valve along the line III—III in Fig. 3.

Figs. 5 and 6 show respectively in plan view the gas mixture admission port of the combustion chamber and the port connecting the compression chamber of the stator to the rotary valve.

Fig. 7 is a section of a device the movable blade is fitted with, in order to insure a tight joint between said blades and the inner wall of the stator.

Referring to Figs. 1 and 2, the rotary internal-combustion engine comprises essentially an outer casing or stator 1 enclosing a rotor 2 secured on a shaft 3 rotatably mounted in bearings 4.

The rotor 2 is of circular cross section and consists of a cylindrical body and the stator 1 is provided all round the periphery of the rotor with chambers having their longitudinal section in arcs of a circle.

In the embodiment of invention as illustrated in Fig. 1, the new rotary engine comprises two chambers, the compression of air occurring in one of said chambers.

The rotor 2 is provided with movable blades 10 adapted to rotate with the rotor so as to form, when travelling in a chamber, a movable partition separating at every moment each chamber in two portions.

The blades 10 are adapted to slide in grooves 11 radially provided in the rotor and they are constrained to radially move with respect to the rotor so that the outer ends of the blades follow the curve of the stator chambers. To this end the blades 10 are arranged to slide by centrifugal force owing to the rotation of the rotor. In order to prevent however any excessive pressure of rotatable parts on the inner wall of said chambers and the braking action which may result therefrom, the radial outward motion of said blades is limited. To this end said blades are connected by rods 12 to rollers 13 adapted to run each in cam grooves 14 of suitable shape cut in two discs 15 conveniently fastened to the lateral sides 16 of the casing 1, each blade being fitted with a packing piece 17 pressed by the springs 18 against the wall of the stator (Fig. 2) or with a head 45 secured by a ball-and-socket joint to the outer end of the blade (Fig. 7) and having one or more packing pieces as shown in 17 in Fig. 2.

Owing to the before mentioned action of the cam grooves 14 on the blades 10 no pressure which may result from the blades 10 projected by the centrifugal force is transmitted to the packing pieces 17 so that the action of the centrifugal force is limited to operate only said packing pieces 17 for outward radial motion by which said packing pieces are kept in constant engagement with the inner wall of the stator without any braking action being exerted.

As illustrated in Fig. 1 the compression of air necessary for forming a motive gas mixture is produced in the chambers of the engine by the blades 10 when running.

To this effect the contiguous chambers 33 and 34 succeeding in the direction of the rotation of the rotor 2 are twined in a pair so that the first chamber of the pair, for instance, the chamber 33 forms compression chamber of the air intended to be mixed with the fuel under pressure so that a gas mixture is formed which has to perform the useful work in the second chamber of the pair, which is the chamber 34.

To this end air admitted at the atmospheric pressure in the chamber 33 by the port 43 is compressed by the fore side of a blade 10 and driven into a rotary tubular valve provided in the stator 1, in which valve the compressed air is mixed with the fuel injected thereinto under pressure so as to form a gas mixture which is ignited in said valve. The gas mixture is then delivered and expands into the combustion chamber in which it acts on the back side of the blade which has been moved in the meantime from the compression chamber to the combustion chamber of the engine.

To this end, according to the invention, said rotary valve 35 is separated by a longitudinal partition 36 into two symmetrical chambers 37 and 38 of equal volumes and provided each with a helical port 39 and 39', said rotary valve 35 being rotatably mounted in a housing 40 of cylindrical form provided in the stator and connected by ports 41 and 42 respectively to the compression chamber 33 and the combustion and expansion chamber 34.

Owing to this particular arrangement of parts, air passes from the chamber 33 of the stator into a chamber 37 in the valve 35 during the whole compression stroke and at the same time the second chamber 38 in the rotary valve remains connected to the combustion and expansion chamber 34 for the whole duration of the combustion and expansion stroke.

The chambers 37 and 38 of the rotary tubular valve 35 are adapted to be successively connected when filled with compressed air to a suitable compressed fuel injection device 46 of any known construction which is connected to said rotary valve 35 in such a manner that fuel under pressure is forced into a chamber of said rotary valve which is filled with compressed air at the moment when this chamber already disconnected from the compression chamber of the engine has rotated in an anti-clockwise direction over such an angle that the helical port of said chamber begins to register with the rectangular port of the combustion and expansion chamber of the rotary engine.

The rotary valve 35 is operated by a driving means 47 so as to constantly rotate in order to connect at the right moment the chamber of the rotary valve containing burning gas mixture with the combustion and expansion chamber of the engine.

The rotary internal combustion engine according to the invention works as follows:

Assuming the movable blades being in the position shown in Fig. 1, air which has been admitted at the atmospheric pressure by the inlet port 43 into the compression chamber 33 is gradually compressed therein by the blade 10' when travelling in the anticlockwise direction in said chamber 33 and is driven into the chamber 37 in the rotary valve 35 which chamber communicates at this moment with the chamber 33 by means of ports 41 and 39' the registering of which lasts during about half a revolution of said valve 35. By the subsequent rotation of the valve 35 said chamber 37 comes to register with the compressed fuel injection device 46 so that fuel is injected under pressure into the chamber 37 just at the moment in which the helical port of the latter begins to register with the port 42 of the chamber 34 of the stator and the blade 10' now travelling in said chamber 34 has passed in the intervening time the port 42. The gas mixture having been spontaneously ignited by the injection of the fuel into the chamber 37, the combustion is thus started in said chamber in the rotary valve 35 and the burning gas mixture enters the chamber 34 behind the blade 10' and propagates therein whereby this blade receives a motor impulse due to the expansion of the gas mixture. The burnt gases resulting from the foregoing combustion are expelled by the foreside of the blade 10' through the exhaust port 44.

In order to allow the ratio of compression to be regulated, according to the invention, the volume of the chambers 37 and 38 of the rotary valve may be adjusted by any suitable known means as, for instance, by modifying the length of said chambers.

It will be understood that suitable lubricating means are provided for the safe working of the engine and tight joints prevent any leakage.

The rotary engine according to the invention is very simple in construction and the working chambers have long strokes so that the combustion and the expansion are sufficiently prolonged so as to permit the transformation of the heat in work as completely as possible. The centrifugal action exerted on the packing rings provides for efficient gas tightness without any excessive friction. The blades 10 being adjustably mounted on the rods 12 (Fig. 2), wear is suitably provided for.

The more favorable heat conditions that arise during working allow the rotary engine to work at a lesser pressure.

It is obvious that the rotary engine which may be stationary or transportable, may be provided with any desired number of working chambers. Several engines may also be mounted on a single shaft.

Having now particularly described and ascertained the nature of my said invention and in what manner the same is to be performed, I declare that what I claim is:

1. A rotary internal combustion engine of the type described comprising in combination a stator, a cylindrical rotor mounted to rotate in said stator, chambers provided in pairs in said stator around said rotor and having their longitudinal section in arcs of a circle, said rotor having radial grooves therein, movable blades operated by centrifugal force for sliding in said grooves, one chamber of each pair being the compression chamber wherein air admitted at atmospherical pressure is compressed by the foreside of a blade when traveling in said chamber, another chamber of each pair being the combustion and expansion chamber in which a motor impulse due to the expansion of a gas mixture when burning is exerted on the rear side of the same blade, means for separately compressing fuel, a tubular housing provided in said stator between two contiguous chambers thereof, a rotary tubular valve operated to rotate in said housing at the same angular speed as said rotor, two chambers of an equal volume provided in said rotary tubular valve, ports provided in said tubular valve, ports provided in said housing and connected to said chambers of the stator, said ports in said rotary valve and said housing being adapted to register so that each chamber of said rotary valve is successively communicating with said compression chamber and said combustion and expansion chamber of the stator, means for delivering fuel under pressure into compressed air contained in a chamber of said rotary valve, which begins to communicate with said combustion and expansion chamber of the stator, whereby a gas mixture is formed and spontaneously ignited within said chamber, said ports being arranged in such a manner that said chambers of said rotary valve are simultaneously communicating with said chambers of the stator, so that the gas mixture is delivered burning from a chamber of said rotary valve into the combustion and expansion chamber of the stator while at the same time air is driven from the stator into the other chamber of said rotary valve.

2. A rotary internal combustion engine of the type described comprising in combination a stator, a cylindrical rotor mounted to rotate in said stator, chambers provided in pairs in said stator around said rotor and having their longitudinal section in arcs of a circle, said rotor having radial grooves therein, movable blades operated by centrifugal force for sliding in said grooves, one chamber of each pair being the compression chamber wherein air admitted at atmospherical pressure is compressed by the foreside of a blade when traveling in said chamber, another chamber of each pair being the combustion and expansion chamber in which a motor impulse due to the expansion of a gas mixture when burning is exerted on the rear side of the same blade, means for separately compressing fuel, a cylindrical tubular housing provided in said stator between two contiguous chambers thereof, a rotary tubular valve having a cylindrical wall and operated to rotate in said housing at the same angular speed as said rotor, a longitudinal partition separating said tubular valve into two symmetrical chambers, rectangular ports provided in said housing and connected respectively to the compression chamber and the combustion and expansion chamber of the stator, a helical port provided in the cylindrical wall of each chamber of said rotary valve, so as to partially register successively with each of said rectangular ports, means for delivering fuel under pressure into compressed air contained in a chamber of said rotary valve, when the helical port thereof is beginning to register with the rectangular port of said housing connected to said combustion and expansion chamber of the stator, whereby a gas mixture is formed and spontaneously ignited within said chamber of the rotary valve, said helical ports and said rectangular ports extending over such a length that a helical port is in register with a rectangular port during about half a revolution of said rotary valve, so that air is driven from the compression chamber of the stator into a chamber of said rotary valve for whole, the duration of the delivering of the gas mixture burning from the other chamber of said valve to the combustion and expansion chamber of the stator.

JACQUES CHKLIAR.